United States Patent [19]
Breyta et al.

[11] Patent Number: 6,153,696
[45] Date of Patent: Nov. 28, 2000

[54] PROCESS FOR FORMING CARBONATES OF HYDROXYAROMATIC COMPOUNDS

[75] Inventors: Gregory Breyta; Daniel Joseph Dawson, both of San Jose, Calif.; Moahmoud Mostafa Khojasteh; Ranee Wai-Ling Kwong, both of Wappingers Falls, N.Y.; Elwood Herbert Macy, Hughsonville, N.Y.; David Paul Merritt, Cold Spring, N.Y.; Wayne Martin Moreau; Stanley Eugene Perreault, both of Wappingers Falls, N.Y.; Harbans Singh Sachdev, Hopewell Junction, N.Y.; Robert Lavin Wood, Poughkeepsie, N.Y.; Hiroshi Ito, San Jose, Calif.

[73] Assignee: International Business Machines Corporation, Armonk, N.Y.

[21] Appl. No.: 08/059,861

[22] Filed: May 10, 1993

Related U.S. Application Data

[63] Continuation of application No. 07/864,721, Apr. 7, 1992, abandoned.

[51] Int. Cl.$^7$ ....................................................... C08F 8/00
[52] U.S. Cl. .......................... 525/118; 558/270; 558/271; 525/328.8; 525/383; 525/480; 430/270.1
[58] Field of Search ..................................... 558/270, 271; 525/118, 328.8, 383, 480; 430/270.1

[56] References Cited

U.S. PATENT DOCUMENTS

| 4,491,628 | 1/1985 | Ito et al. | 430/176 |
| 4,552,833 | 11/1985 | Ito et al. | 430/325 |
| 4,613,398 | 9/1986 | Chiong et al. | 156/628 |
| 4,931,379 | 6/1990 | Brunsvold | 430/176 |

OTHER PUBLICATIONS

H. Ito; Solid State Thermolysis of BTBOC Catalyzed by Phenol; Jrnl Polymer Science, Polymer Chemistry; vol. 24, (1986), pp. 2971–2980.

F. Houlihan, et al. "Phase Transfer Catalysis in the tert–Butyloxycarbonylation of Alcohols, Phenols, Enols, and Thiols with di–tert–Butyl Dicarbonate", Can. J. Chem., 63, 153 (1985).

*Primary Examiner*—Rachel Gorr
*Attorney, Agent, or Firm*—Steven Capella

[57] ABSTRACT

A process for the stoichiometric carbonation of a hydroxyaromatic material is provided which comprises the steps of (a) mixing together in a reaction vessel (1) a hydroxyaromatic material, (2) a sufficient amount of a dialkyl dicarbonate to give the desired degree of substitution, (3) a catalytic amount of an unhindered tertiary amine, and (4) a solvent, (b) stirring the reaction mixture, (c) precipitating the alkyl carbonate of the hydroxyaromatic material, and (d) recovering the alkyl carbonate of the hydroxyaromatic material.

17 Claims, No Drawings

PROCESS FOR FORMING CARBONATES OF HYDROXYAROMATIC COMPOUNDS

The application is a continuation of application Ser. No. 07/864,721, filed Apr. 7, 1992, now abandoned.

FIELD OF THE INVENTION

The present invention relates to processes for carbonation (forming carbonates) of hydroxyaromatic compounds. The processes include the manufacturing of acid-labile group substituted polymers and monomers. These carbonated materials are useful in photoresist compositions and applications.

BACKGROUND ART

The use of phenolic polymers in photoresist compositions which are used in the fabrication of semiconductor devices is well known. Improvements in photoresists have created a need for resist components that have sufficient radiation or lithographic sensitivity to be of use in the fabrication of very large scale integration (VLSI) devices and ultra large scale integration (ULSI) devices. To meet these demands, chemically amplified photoresist compositions have been developed which generally comprise a polymer having acid sensitive functionalities and a compound which generates a strong acid upon radiation by UV light and/or electron beam (e beam) or x-ray radiation, referred to generally hereinafter as a "photoacid". The functionalized polymer reacts with the photoacid formed to fragment or release a portion of the functional group and regenerated acid to continue the photolysis or radiolysis reaction. Because a series of functional group changes can result from a single photon (or electron) absorbed, this process is referred to as "chemical amplification."

U.S. Pat. No. 4,491,628 to Ito et al. is directed to resist compositions or formulations comprising a polymer having recurrent acid labile groups (such as t-butyl esters and t-butyl carbonates) pendant to the polymer chain and a photoacid such that the acid labile groups undergo cleavage from the polymer upon the radiation of the composition and release of the photoacid. The photoacid is generated by an onium salt. These compositions were found to exhibit particularly desirable properties for photolithography in that they are positive or negative working based solely on the choice of developer solvents.

U.S. Pat. No. 4,552,833 to Ito et al. is directed to processes for generating negative images in a polymer film having masked reactive functionalities that is treated with an organometallic reagent after exposure and is dry developed with a reactive plasma after such treatment.

U.S. Pat. No. 4,613,398 to Chiong et al. is directed to processes for removing acid labile groups from polymer materials and treatment with organometallic agents so that the films may be dry developed.

U.S. Pat. No. 4,931,379 to Brunsvold et al. is directed to thermally stable resist compositions having secondary alkyl carbonates pendant to an aromatic group of a repeating polymer composition.

U.S. patent application Ser. No. 07/264,407, filed Oct. 28, 1989, to Merritt et al., Attorney Docket No. FI9-88-037, discloses certain partially t-butyloxycarbonyloxy substituted poly(p-hydroxystyrenes) and methods for their manufacture. These methods include acidolysis and thermolysis of poly (p-t-butyloxycarbonyloxystyrenes) and amine catalyzed carbonation of poly(p-hydroxystyrene) with di-tert-butyl dicarbonate.

Houlihan et al., *Can. J. Chem.*, 63, 153 (1985), describes various mechanisms of phase transfer catalysis in the tert-butyloxycarbonylation of alcohols, phenols, enols, and thiols with di-tert-butyl dicarbonate. The tert-butyloxycarbonylation of phenolic polymers such as poly-(p-hydroxystyrene) and novolaks was said to proceed rapidly and quantitatively with di-tert-butyl dicarbonate in THF, ethyl acetate, or dichloromethane, in the presence of a catalytic amount of crown ethers such as 18-crown-6 and an equivalent amount of powdered anhydrous potassium carbonate.

It is an object of the present invention to provide an improved method to manufacture carbonated hydroxyaromatic compounds which provide a uniform product and near quantitative yields. Carbonated hydroxyaromatic (particularly t-butyloxycarbonyloxy substituted) polymers and monomers are especially useful in resists for use in photolithography.

SUMMARY OF THE INVENTION

In accordance with the present invention, a process for the precise and stoichiometric carbonation of a hydroxyaromatic material is provided which comprises the steps of (a) mixing together in a reaction vessel (1) a hydroxyaromatic material, (2) a sufficient amount of a dialkyl dicarbonate to give the desired degree of substitution, (3) a catalytic amount of an unhindered tertiary amine, and (4) a solvent, (b) stirring the reaction mixture, (c) precipitating the alkyl carbonate of the hydroxyaromatic material, and (d) recovering the alkyl carbonate of the hydroxyaromatic material. In this process, the hydroxy aromatic material may be a polymeric material such as a poly-(p-hydroxystyrene) or a novolak resin or it may be a monomeric phenol such as Bisphenol A or tris(hydroxyphenyl)ethane. The dialkyl dicarbonate is a primary, secondary or tertiary dicarbonate and include diethyldicarbonate di-cyclohexyldicarbonate, di-sec-butyldicarbonate, di-isopropyldicarbonate, di(2-pentyl)dicarbonate, di(substituted deactivated secondary benzyl) dicarbonate, di(1-(deactivatedheterocyclic) secondary-alkyl)dicarbonate, di-tert-butyl dicarbonate, or di-(t-amyl)dicarbonate. The unhindered tertiary amine may be dimethylaminopyridine, 4-pyrrolidino-pyridine, diethylmethylamine, trimethylamine, N-methylpyrrolidine, or a polymer having unhindered amino groups linked thereto.

DETAILED DESCRIPTION

It has been surprisingly found that the preparation of carbonated hydroxyaromatic compounds is enhanced by the use of a catalytic amount (i.e., not consumed in the reaction) of an unhindered tertiary amine to facilitate the reaction. As used herein catalytic amounts of tertiary amine are from about 0.02 to about 0.001 molar equivalent of the carbonates being substituted. (That it, the ratio of carbonate to tertiary amine is in the range from 50:1 to 1000:1.) The process of the invention is a precise stoichiometric reaction that enables the production of carbonated materials which have a lot to lot consistency that is not achieved in prior processes because residual base in the composition may react with and neutralize the photoacid while excess acid will promote the excess decarbonylation of the copolymer.

The process is useful in obtaining a carbonate of an aromatic polymer or monomer having a degree of substitution from 10–100%. By "degree of substitution" it is meant that the percent of available hydroxyl groups have been converted to the desired carbonate.

This process is of particular utility when the end-product is a partially derivatized poly-(p-hydroxystyrene) for use in photolithography. When a polymer having from 10–40% t-butyloxycarbonloxy substitution is desired, the process comprises change in a reaction vessel with poly(p-hydroxystyrene) and a stoichiometric fraction of di-tert-butyl dicarbonate in solvent for the reactants. A catalytic amount of an unhindered tertiary amine such as 2-dimethylamino pyridine or 4-dimethylamono-pyridine is added to the reaction mixture which is then stirred at ambient temperature until the copolymer of partially t-butyloxycarbonyl O-substituted poly(p-hydroxystyrene) is formed. Work up and recovery steps follow.

The final material has consistant, reproducible lithographic properties due to the process simplification which avoids separation of reactants from final products. Thus any potential contamination due to environmental interactions with the reactants is avoided. The product is very consistent in terms of dissolution rate (DR) which is a function of the dialkyl dicarbonate used and the degree of substitution. The lithographic results are consistent in terms of dose-to-clear (DTC) and thinning.

The invention is further exemplified by the examples which follow and which do not limit the scope of the invention that is disclosed.

EXAMPLE 1

15.00 Kg of poly(4-hydroxystyrene)(pHOST) was dissolved in 110 L of acetone at ambient temperature (between 20–30° C.). 5.040 Kg of di-tert-butyldicarbonate (DTBDC) was dissolved in about 7.57 L of acetone and was added to the pHOST solution with stirring. To this mixture, 14.10 g of 4-dimethyl-aminopyridine(4-DMAP) dissolved in 200 mL of acetone was added. An additional 100 mL of acetone was added. Poly(4-hydroxystyrene) (pHOST) was dissolved in 110 L of acetone at ambient temperature (between 20–30° C.). The mixture was stirred at room temperature with a low rate nitrogen sweep. The progress of the reaction was determined by taking a sample for infrared spectroscopy and applying a thin coat to a crystal and letting it dry. The coated sample was run in the spectrometer between 2000 and 1550 wavenumbers. The reaction is complete when the peak at 1805 wavenumbers (the dicarbonate C=O stretch region) is missing. After the reaction went to completion, the product was precipitated in a 1% aqueous isopropyl alcohol (IPA). The precipitate was filtered and redissolved in acetone. When the reaction is complete, precipitation very slowly (over a 3–4 hour period) is begun with maximum agitation into 1,200 liters of deionized water containing 12 liters of isopropyl alcohol. The product was reprecipitated in 1% aqueous isopropyl alcohol, filtered and rewashed and back washed with $H_2O$/IPA and $H_2O$. The product was dried on the filter in a stream of dry $N_2$ for about 24 hours. The product was then placed in a vacuum at 40° C.

The performance of samples made in accordance with this process was as follows:

| Sample No. | DTC mJ/cm$^2$ | Thinning Å |
|---|---|---|
| 1 | 10 | 302 |
| 2 | 10 | 428 |
| 3 | 10 | 390 |

-continued

| Sample No. | DTC mJ/cm$^2$ | Thinning Å |
|---|---|---|
| 4 | 10 | 371 |
| 5 | 10 | 386 |

EXAMPLE 2

60 g of a novolak resin (o-cresolnovolak) was dissolved in 500 mL of acetone, 115 g of DTBDC was dissolved in 300 mL of acetone, and 0.69 g of DMAP was dissolved in 10 mL of acetone. These reactants were mixed together in a 1000 mL 3-neck flask and were warmed to 40° C. The reaction mixture was stirred for about 1 hr. The product was precipitated with DI water and was filtered and dried. The hydroxy groups of the novolak were fully carbonated. The t-butyloxycarbonyloxynovolak has good lithographic properties.

EXAMPLE 3

11.30 g of o-cresolnovolak was dissolved in 50 mL of acetone, 2.72 g of DTBDC was dissolved in 25 mL of acetone, and 0.023 g of DMAP was dissolved in 5 mL of acetone. These reactants were mixed together in a 500 mL 3-neck flask and were processed as in Example 3. A 12.5% substituted product was recovered which exhibited good lithographic properties.

It has also been found that the catalytic synthesis of this invention works extremely well with smaller (non-polymeric) molecules. This provides a very facile reaction for use in the synthesis of small molecule dissolution inhibitors that are useful in photoresist compositions. This reaction provides an excellent way to prepare bis-t-butyloxycarbonyloxy derivatives of Bisphenol-A ("bis-BOC") and tris-t-butyloxycarbonyloxy derivatives of tris (hydroxy-phenyl)ethane (THPE) ("tris-BOC"). The bis-BOC and tris-BOC materials are examples of a class of attractive dissolution inhibitors for use in 3-component photoresist systems.

EXAMPLE 4

10.0 g of Bisphenol A, 19.3 g DTBDC, and 0.05 g DMAP were dissolved into 150 mL acetone and stirred at room temperature for 2 hours. IR analysis at this point showed no phenol present and no dicarbonate. Reaction was precipitated into 1 L water and dried under vacuum at 50° C. to give the bis-BOC off-white pellets. Yield 18.3 g (97.1%).

EXAMPLE 5

10.0 g of THPE, 21.4 g DTBDC, and 0.012 g DMAP were dissolved in 100 mL acetone and stirred at room temperature overnight. Solution volume was reduced by approximately half, then precipitated into 2 L $H_2O$, filtered, and dried in 50° C. vacuum oven to recover tris-BOC a solid. Yield 19.0 g (95.6%).

It has been found that in addition to di-tert-butyldicarbonate, other carbonates are useful in the process of the invention as well. These carbonates include di-(t-amyl)dicarbonate and diethyl dicarbonate (diethyl pyrocarbonate). The t-amyl and diethyl dicarbonates analogous to the t-butyl provide more dramatic polarity changes in the photoresists or dissolution inhibitors prepared with these materials. These different carbonates may offer selectively removable protecting groups for future syntheses which may have broad applicability beyond their use in photoresists.

EXAMPLE 6

5.0 g of poly PHOST, 1.35 g of diethyl pyrocarbonate and 0.005 g 4-DMAP were dissolved in 40 mL acetone. (Same relative molar ratios as in Example 1). The reaction was complete in 3 hours (much faster than with DTRDC). The reaction solution was precipitated into 500 mL $H_2O$ containing 1% IPA. This was reprecipitated from 40 mL acetone into 1% IPA in $H_2O$ (500 ml) and dried over the weekend in a 40° C. vacuum oven to give 5.5 g polymer.

EXAMPLE 7

10.0 g of PHOST, 3.9 g of di(t-amyl)dicarbonate and 0.02 g 4-DMAP were dissolved into 100 mL of acetone. After 5 hours the reaction was complete. 6 drops of acetic acid (AcOH) were added, stirred for 0.5 hours, and precipitated into 1 L $H_2O$ buffered with 10 g $NH_4OH$ adjusted to pH=5 w/ AcOH. This was filtered and rinsed with several $H_2O$ washings, sucked dry and dried in a vacuum oven for 2 days at 45–50° C. This material looked identical to the product of Example 3 of U.S. Ser. No. 07/264,407, filed Oct. 28, 1989, referred to above, using contact print exposure with step wedge.

The following table shows the relative amounts of aromatic hydroxyl containing compound (phenolic) to carbonate to tertiary amine in the foregoing examples.

| Example | Aromatic | Carbonate | Tertiary Amine | Ratio Carbonate to Amine |
|---|---|---|---|---|
| 1 | 6.67 | 1 | 0.053 | 187:1 |
| 2 | 1.14 | 1 | 0.011 | 92:1 |
| 3 | 9.09 | 1 | 0.015 | 65:1 |
| 4 | 0.515* | 1 | 0.0046 | 215:1 |
| 5 | 0.355** | 1 | 0.001 | 972:1 |
| 6 | 2 | 1 | 0.004 | 250:1 |
| 7 | 625 | 1 | 0.10 | 100:1 |

*1.03 equivalent of OH
**1.06 equivalent of OH

It is evident that only a very small amount of tertiary amine is necessary to drive the reaction to completion.

Although this invention has been described with respect to specific embodiments, the details thereof are not to be construed as limitations, for it will become apparent that various embodiments, changes and modifications may be resorted to without departing from the spirit and scope thereof, and it is understood that such equivalent embodiments are intended to be included within the scope of this invention.

We claim:

1. A process for the stoichiometric carbonation of a microlithographically useful polymer comprising hydroxyaromatic groups comprising the steps of
   (a) mixing together in a reaction vessel
      (1) a hydroxyaromatic material,
      (2) a stoichiometric amount of a dialkyl dicarbonate to give the desired degree of substitution,
      (3) a catalytic amount of an unhindered tertiary amine, wherein the amine is selected from the group consisting of amines comprising substituted and unsubstituted heterocyclic compounds, diethylmethyl amine, trimethyl amine, and polymers having unhindered amino groups, and
      (4) a solvent with the proviso that the reaction mixture does not contain an organic amine base in an amount exceeding 0.02 molar equivalents based on the dialkyl dicarbonate, and
   (b) stirring the reaction mixture,
   (c) precipitating the alkyl carbonate of the hydroxyaromatic material, and
   (d) recovering the alkyl carbonate of the polymeric hydroxyaromatic material.

2. The process of claim 1 where the tertiary amine is present in the range from about 0.001 to 0.02 molar equivalents based on the dialkyl dicarbonate.

3. The process of claim 1 wherein the hydroxy aromatic material is selected from the group consisting of phenolic polymers and monomeric phenols.

4. The process of claim 3 wherein the phenolic polymers comprise poly(hydroxystyrenes) and novolak resins.

5. The process of claim 3 wherein the monomeric phenols comprise Bisphenol A and tris(hydroxphenyl)ethane.

6. The process of claim 1 wherein the dialkyl dicarbonate is selected from the group consisting of primary, secondary and tertiary dialkyl dicarbonates.

7. The process of claim 6 wherein the tertiary dialkyl dicarbonates comprises di-tert-butyl dicarbonate and di-(t-amyl)dicarbonate.

8. The process of claim 6 wherein the primary dialkyl dicarbonate comprises diethyl dicarbonate.

9. The process of claim 1 wherein the unhindered tertiary amine comprises 2-dimethylaminopyridine, 4-dimethylaminopyridine, 4-pyrrolidino-pyridine, diethylmethylamine, trimethylamine, N-methylpyrrolidine, and polymers having unhindered amino groups.

10. A process for preparing a microlithographically useful, stoichiometrically derivatized poly(p-hydroxystyrene) having a degree of substitution of from 10–100% comprising the steps of
   (a) mixing together in a reaction vessel at ambient temperature
      (1) poly(p-hydroxystyrene),
      (2) a stoichiometric amount of di-tert-butyl dicarbonate to give the desired degree of substitution, and
      (3) a catalytic amount of a dimethylaminopyridine in a solvent for the reactants, with the proviso that the reaction mixture does not contain an organic amine base in an amount exceeding 0.02 molar equivalents based on the di-tert-butyl dicarbonate, and
   (b) stirring the reaction mixture,
   (c) precipitating the t-butyloxycarbonyl O-substituted poly(p-hydroxystyrene), and
   (d) recovering the precipitated t-butyloxycarbonyl O-substituted poly(p-hydroxystyrene).

11. The process of claim 10 wherein the tertiary amine is present in the range from about 0.001 to 0.02 molar equivalents based on the dialkyl dicarbonate.

12. The process of claim 10 wherein the dimethylaminopyridine is selected from the group consisting of 2-dimethylaminopyridine and 4-dimethylaminopyridine.

13. The process of claim 10 wherein the degree of substitution is from 10–40%.

14. A process for preparing a microlithographically useful, stoichiometrically derivatized novolak resin having a degree of substitution of from 10–100% comprising the steps of
   (a) mixing together in a reaction vessel at ambient temperature
      (1) novolak resin,
      (2) a stoichiometric amount of di-tert-butyl dicarbonate to give the desired degree of substitution, and (3) a catalytic amount of a dimethylaminopyridine in a solvent for the reactants, with the proviso that the reaction mixture does not contain an organic amine base in an amount exceeding 0.02 molar equivalents based on the di-tert-butyl dicarbonate, and (b) stirring the reation mixture, (c) precipitating the t-butyloxycarbonyl O-substituted novolak resin, and (d) recovering the precipitated t-butyloxycarbonyl O-substituted novolak resin.

15. The process of claim 14 wherein the tertiary amine is present in the range from about 0.001 to 0.02 molar equivalents based on the dialkyl dicarbonate.

16. The process of claim 14 wherein the dimethylaminopyridine is selected from the group consisting of 2-dimethylaminopyridine and 4-dimethylaminopyridine.

17. The process of claim 14 wherein the degree of substitution is from 10–40%.

* * * * *